United States Patent Office 3,549,528
Patented Dec. 22, 1970

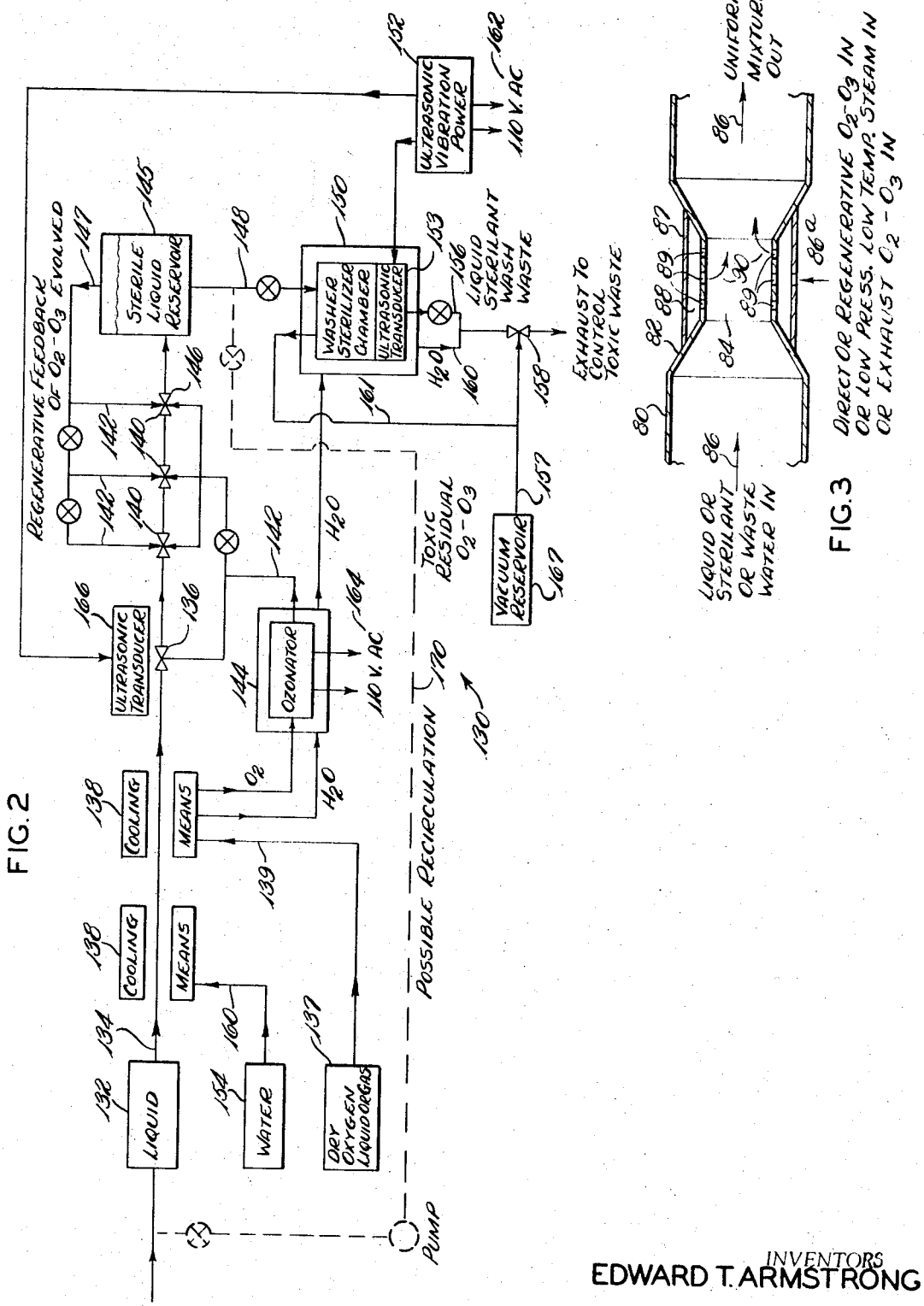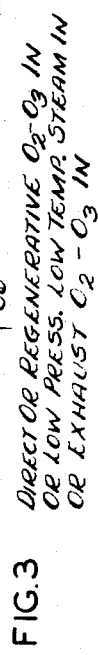

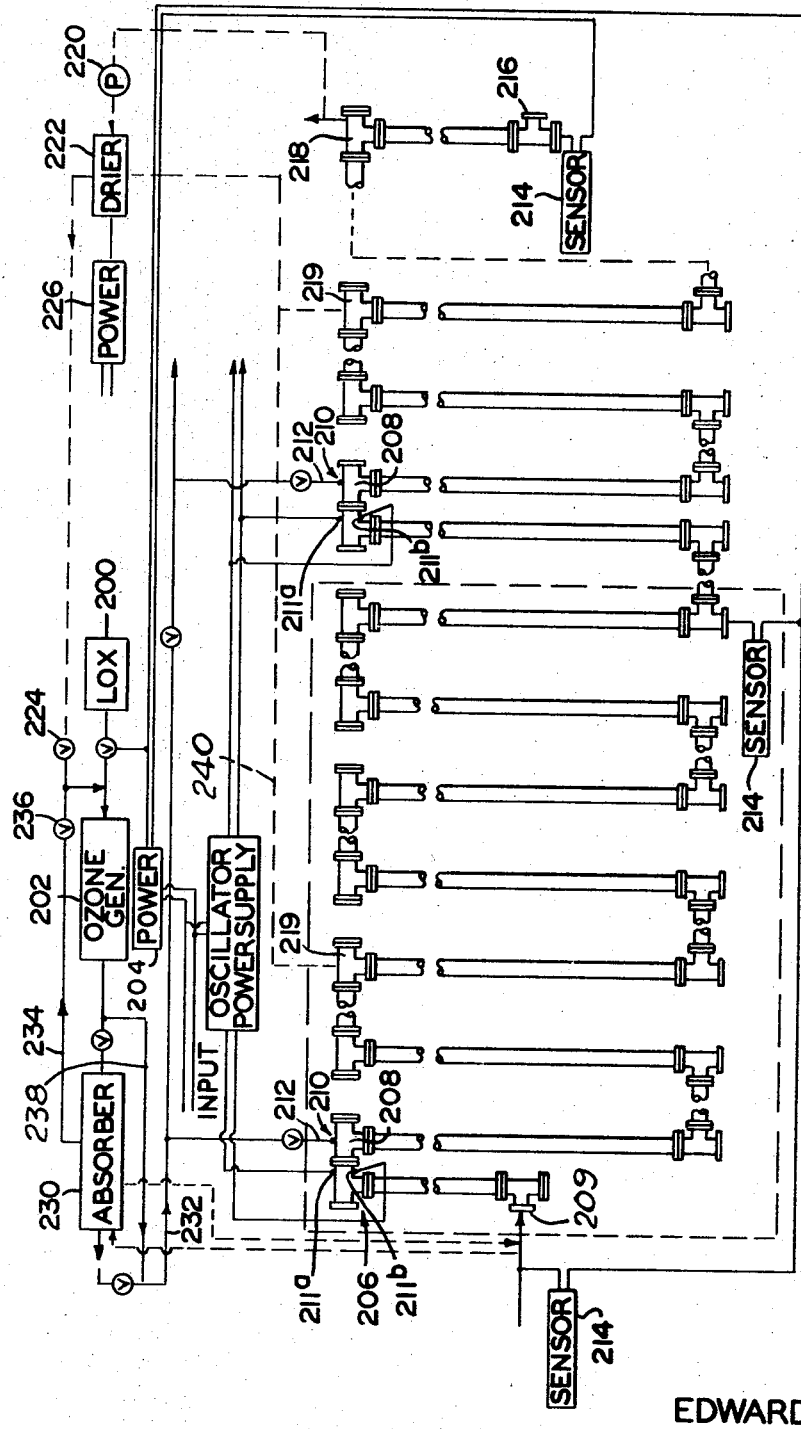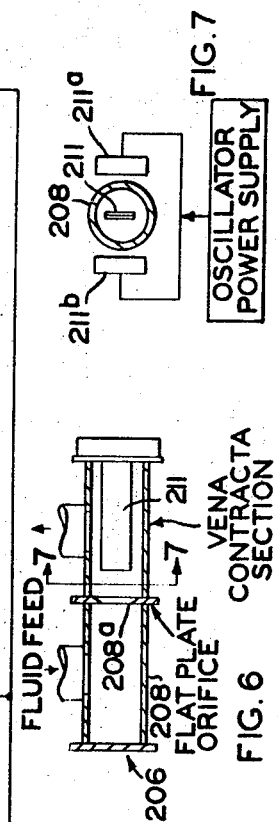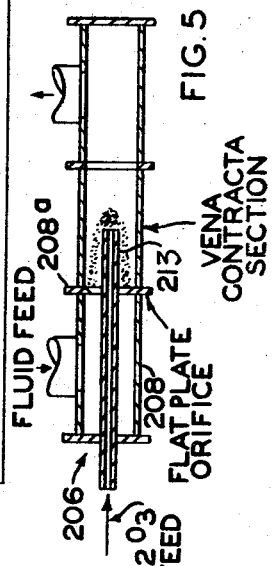

3,549,528
OZONE STERILIZATION PROCESS
Edward T. Armstrong, 490 Pepperidge Tree Terrace,
Smoke Rise, Butler, N.J. 07405
Continuation-in-part of application Ser. No. 362,118,
Apr. 23, 1964. This application Feb. 28, 1969, Ser.
No. 813,382
Int. Cl. A61l 13/06; C02b 1/38, 3/08
U.S. Cl. 210—60
12 Claims

ABSTRACT OF THE DISCLOSURE

A unique utilization of oxygen and ozone generated from oxygen in a gaseous form singly or in combination as from air, or a carbon dioxide-oxygen mixture used as a solution or with superheated water vapor is contemplated in process and apparatus. A sterilant is made by passing a fluid in a flow dominated by a hydraulic pressure gradient characterized by an overall pressure drop per unit of line length reduced from the gravitational gradient pressure drop per unit of line length of one foot of fluid per foot of distance by several orders of magnitude, substantially uninfluenced by the gravitational pressure gradient incidentally present creating local areas of high momentum exchange at restrictions in the flow, and introducing gaseous oxygen-ozone into the liquid at these points where the static pressure is regained thus modifying the velocity profile in fully developed turbulent flow to achieve maximum uniformity of oxygen-ozone concentration throughout the fluid whereby the solubility of the oxygen-ozone into the fluid is greatly enhanced. Further, this process may also be operated at a reduced incident gas content in the fluid and possibly at a temperature reduced to increase the solubility of oxygen-ozone, and sterilization within the fluid conduit or container takes place during a distance in which the hydraulic pressure gradient is continuously imposed to ensure maximum solubility of the oxygen-ozone into the fluid by reason of intense mixing and restricted pressure change.

The invention relates to an ozone sterilization process and apparatus, and more particularly to a unique utilization of oxygen-ozone either singly or in combination with nitrogen from air, carbon dioxide or water vapor, or as a solution to effect sterilization of materials and more specifically the surfaces of surgical or medical instruments. It is a continuation-in-part of application Ser. No. 362,118, filed Apr. 23, 1964, which is my copending application for "Ozone Sterilization Process and Apparatus," now abandoned.

In the past, gas sterilization other than with steam has usually been proposed for (1) water purification, (2) elimination of microorganisms from sewage, (3) utilization in autoclaves for sterilizing medical instruments and supplies, and (4) the sterilization of bottles. Generally, the sterilization processes above have utilized gases such as chlorine, sulfur dioxide, formaldehyde or ethylene oxide, and the process: takes a considerable degree of time in order to achieve effective sterilization, is incompatible with many materials, is ineffective in achieving uniform, consistent levels of gas concentration, is carried out in a gravitational pressure gradient which results in high operating costs and low efficiency, is unduly large and expensive, or is inconsistent in microbicidal effectiveness. These processes have not been adaptable to an ozone process because of the difficulty in controlling the concentration and the consistent effectiveness of ozone.

A gas sterilization process for bottles has been set forth by Seitz using sulfur dioxide and was adapted to ozonized air by Torricelli as described on p. 375, vol. 21 of the "Advances in Chemistry Series." This adaptation of the Seitz process utilizes ozonized air to replace sulfur dioxide in a sterilization process, and operates successfully to effect sterilization in a short period of time on freshly washed, rinsed, and wet drained glass containers.

The same reference sets forth a number of air-ozone injecting and mixing means for the purification of water. In all prior art, namely the processes of: Otto, Van DerMade, Welsbach and Torricelli, ozonation is accomplished primarily by bubbling ozonized air in a contact chamber where the gas-water exchange is dominated by the gravitational pressure gradient.

This may be contrasted with the applicant's process and means where ozonized oxygen is injected and is subjected for a prolonged period under and in a hydraulic pressure gradient characterized by turbulent flows, i.e. by a Reynolds number greater than 3,000. The hydraulic pressure gradient itself is one in which the pressure variation as shown in Engineering Manual, McGraw-Hill Book Co., Perry, pp. 2–35, is given by:

$$\Delta H_t = f \frac{L}{D} \frac{V^2}{2g}$$

in which:

$\Delta H_t$ is the head loss in feet of fluid
$f$ is the Fanning factor which is equivalent to 64/Reynolds number for laminar flow and $0.316/(\text{Reynolds number})^{1/4}$ for turbulent flow
$L$ is the length in feet
$D$ is the diameter in feet
$V$ is the velocity in feet per second
$g$ is the gravitational constant in 32.2 feet per second$^2$.

Turbulence is defined by chart values as shown in Perry, pp. 2–6, and, for smooth pipes, cannot be assumed to be stable below a Reynolds number of 3,000. For roughened pipes, the chart shows, the stable incidence of turbulent flow occurs at about a Reynolds number of 10,000.

The art cited shows that for ozonized air and the gas-water contact means used, a "contact time" of about 8 to 10 minutes sufficies to achieve disinfection if excess ozone is used and a considerable loss of ozone which cannot be dissolved in the water is incurred.

The literature implies a problem which has remained unresolved and which is complicated by many factors. These include: limited ozone-air solubility, indifferent gas-liquid mixing and lack of sustained ozone-liquid contact at substantially constant pressure, variable water demand for ozone, depending on its content of oxidizable substances and excessive loss of ozonized air. It is the object of the invention to resolve these problems.

An object of the invention is to provide a sterilization process for use in a vessel where the sterilant is a liquid such as a solution of oxygen-ozone, where the pressure and the temperature of the solution of oxygen-ozone is firmly controlled during the sterilization process and the solution of oxygen-ozone resulting from the sterilization is discharged to waste upon completion of sterilization.

A further object of the invention is to provide a sterilization process utilizing a liquid sterilant comprised of a solution of oxygen-ozone where diffusion gradients in the solution of ozone may be suppressed during the sterilization process by providing high momentum exchange at the point of injection and subsequently in the conduit and by using preceding particulate breakdown or in-conduit or post-conduit ultrasonic excitation thereby increasing the equilibrium ozone concentration, and where the tolerable excitation energy levels and the oxygen-ozone solubility have been increased by sustaining modest temperatures and by pressurizing the system to suppress cavitation limitations and to retain oxygen-ozone in solution. Excess excitation may be imposed post-conduit to desorb oxygen for control reuse.

The aforesaid objects of the invention and other objects which will become apparent as the description proceeds are achieved by providing a process for sterilization of liquids or materials which includes the steps of flowing a fluid capable of dissolving a sterilant at a substantially uniform hydraulic pressure gradient through a conduit, intimately mixing a gaseous sterilant with such fluid by imposing and sustaining a high momentum exchange between the fluid and sterilant with a substantially instantaneous injection of the sterilant into the fluid after a momentarily reduced pressure and in a turbulent condition in the conduit so as to provide a uniform concentration of sterilant throughout the fluid at the point of sterilant injection and subsequently throughout the length of the conduit, utilizing the fluid with sterilant concentration therein to achieve sterilization by maintaining the hydraulic pressure gradient for an appropriately extended period of time to achieve sterilization, and where the sterilant is oxygen-ozone and is adaptable to any liquid or material.

For a better understanding of the invention reference should be had to the accompanying drawings, wherein:

FIG. 2 is a block schematic diagram of a flow chart for the proposed sterilization process utilizing ozone in the form of a solution;

FIG. 3 is a fragmentary cross-sectional view of one of the proposed injectors of the invention;

FIG. 4 is a block diagram schematic illustration of a hydraulic gradient liquid system;

FIG. 5 is an enlarged broken away cross-sectional view of the injector included in the system of FIG. 4;

FIG. 6 is an enlarged broken away cross-sectional view of the sting particle separator included in the system of FIG. 4; and FIG. 7 is a view of the sting taken on line 7—7 of FIG. 6.

Figure 1:
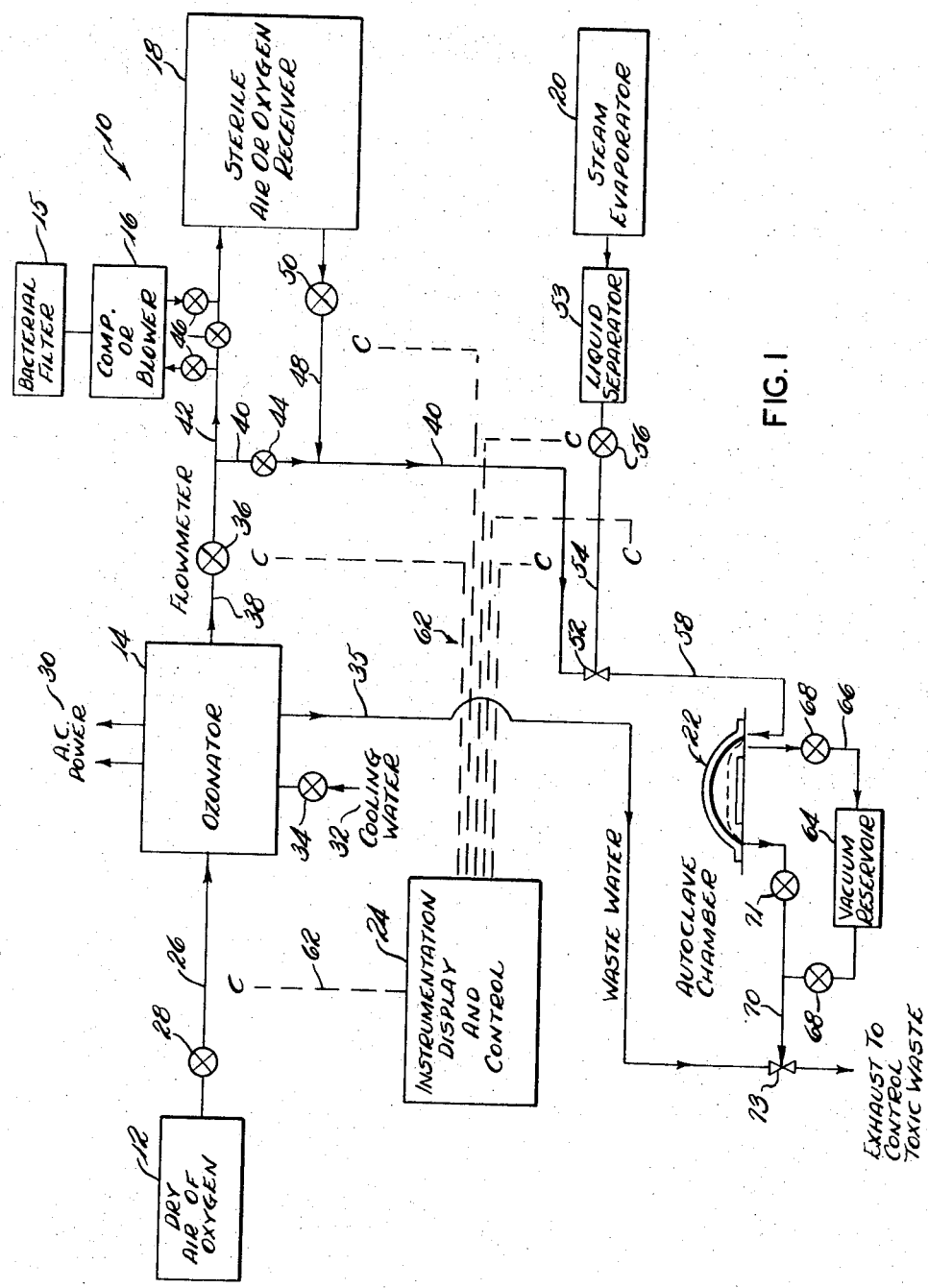
FIG. 1 is a block schematic diagram of a flow chart for the proposed gaseous ozone sterilization process.

Although the broad features of the processes and the system may be adaptable to many types of sterilization including liquid and solid purification, disinfection and sterilization, it is contemplated that the invention is most adaptable to treatment of liquids, or the generation of a sterilizing solution for purification, disinfection or sterilization, and hence it has been so illustrated and will be so described.

GASEOUS SYSTEM

The basic equipment and flow process for the sterilization technique of the invention are shown in FIG. 1, and indicated generally by numeral 10. The apparatus includes a source of dry oxygen or air 12, an ozonator 14, a bacterial filter 15, a compressor or blower 16, a sterile air or oxygen receiver 18, a steam evaporator 20, an autoclave chamber 22, and an instrumentation display and control panel 24. The dry oxygen or air 12 passes through a line 26 to the ozonator 14 and is regulated in its flow by a valve 28. An AC power source 30 is provided to actuate the ozonator 14 while a cooling water system 32 with a regulating valve 34 is used in combination with the ozonator 14 to achieve proper temperature control therein. Waste discharge cooling water passes from the ozonator in line 35. A flow meter 36 accurately determines the volume of flow of oxygen or air with ozone mixed therein through a discharge line 38 from the ozonator 14.

The ozonized dry oxygen or air passing through the flow meter 36 can then be sent directly to the autoclave chamber 22 through a line 40 or can be directed to the sterile air or oxygen receiver 18 generally via the compressor or blower 16 or the bacterial filter 15 through a line 42. The regulating valves 44 and 46 control flow through the lines 40 and 42, respectively. Generally, the invention anticipates that the valve 44 will be closed so that the ozonized dry oxygen or air will be directed into the sterile air or oxygen receiver 18 by means of the compressor or blower 16 drawing on the flow through the flow meter 36. Thus, the sterile air or oxygen receiver 18 becomes a storage area to provide a constant source of ozonated gas, hereinafter called the sterilant, for use in the autoclave chamber 22. The sterilant passes from the sterile air or oxygen receiver 18 through a discharge line 48 with the flow controlled by a valve 50. The sterilant passes into an injector 52 carried in the line 40. Steam is also introduced into the injector 52 as the steam from the evaporator 20 is adapted to pass through a liquid separator 53 into line 54 with the flow controlled by a regulating valve 56. As a very important feature of the invention the sterilant from line 48 and the steam from line 54 are intimately mixed in the injector 52, with this mixture then passing through a line 58 and into the autoclave chamber 22. The exact features of the injector 52 will be more fully described hereinafter. Suffice it to say at this point that the action of the injector is to introduce water vapor at low pressure and low temperature into an intimate mixture with the sterilant at the latest possible time to minimize the accelerated decomposition of ozone which occurs in the presence of water vapor at elevated temperature and pressure and thus to sustain the maximum concentration of ozone in oxygen or air in the autoclave chamber 22 during sterilization.

To further suppress $O_3$ decomposition to $O_2$, a sequential injection of water vapor in the form of superheated steam at low temperature may be introduced at or following the injector 52. However, this water vapor would then be substantially removed prior to sterilant injection into the autoclave chamber 22. In this manner, then, minimum steam inflow in the injector 52 is sufficient to achieve adequate humidification at sustained maximized $O_3$ concentration.

The instrumentation and control panel 24 has control means indicated by the plurality of dotted lines, and generally designated by the numeral 62. These control lines 62 are adapted to control every regulating valve and the flow meter to effectively establish and control the time sequence of pressure, temperatures, flow rate, and composition of the sterilant introduced into the autoclave chamber 22 to accurately control the exposure time, water vapor content, and pressure in the chamber 22 to achieve optimum sterilization. It is anticipated that a programming means including a punched card and a button selector may be utilized to effect positive control and error check of the panel 24 and to permit selection and authentication of the desired sterilization cycle. Also, it is anticipated that suitable pressure and temperature, ozone and vapor contents through the system will be about as follows: The initial pressure is equal to or less than about 8 p.s.i.g. $O_2$, later it is equal to or greater than about 0.5 in. of mercury absolute for the mixture of $O_3$ in $O_2$ or air; water temperature is about 60° F. to 90° F. $O_3$ is about 40 mg./l.; density of water vapor is equal to or less than 0.9 of saturated density.

A vacuum source 64 may be connected to the chamber 22 by means of a line 66 incorporating regulating valves 68 to control the flow therethrough. The vacuum may be used to exhaust the chamber 22 or alternatively to effect volume changes which decrease the time of sterilization, and enable the exhaust of the sterilant to the atmosphere if desired through a discharge line 70 therefrom. A valve 71 may be used to bypass the vacuum reservoir 64 as a direct exhaust from the autoclave chamber 22.

In order to effectively control the waste discharged from the autoclave chamber 22 which is toxic, the invention contemplates that the waste will be discharged into an injector 73 in the line 35 with the waste cooling water from the ozonator 14 actuating the injector 73 to exhaust the toxic waste.

As a further possible step to enhance the sterilization process, the invention contemplates that steam vapor may be injected into the exhaust from the chamber 22 prior to the injection of the sterilant gas into the chamber 22. In this situation the injector means shown may be sequentially valved to control the humidity in the chamber 22 as the sterilant gas is introduced thereinto.

STRUCTURAL COMPONENTS

FIG. 3 illustrates the injector 52 which consists of a pipe section 80 having a narrowed neck portion 82 describing essentially a venturi throat 84. An alternative injection using a flat plate orifice is illustrated in FIGS. 4 and 5. The direction of the flow of the sterilant is indicated by the arrows 86. Steam is introduced as indicated by arrow 86a into a surrounding housing 87 defining a chamber 88 which injects steam through a plurality of orifices 89 in a direction indicated by the arrow 90 so that the steam is directed into the region of reduced pressure at the venturi throat 84. This achieves a complete intimate mixing of the steam with the sterilant to insure instantaneous humidification of the dry sterilant to minimize the accelerated decomposition of ozone which enhances the sterilization process as described above.

OPERATION

The sequential steps in the operation of the sterilizing apparatus of FIG. 1 are essentially as follows:

(1) The instrument display and control panel 24 opens valve 28 to admit dry oxygen or air 12 under controlled pressure into the ozonator 14 where ozone is formed from the dry oxygen.

(2) The compressor or blower 16 draws a predetermined amount of air through the bacterial filter 15 and directs it into the sterile air or oxygen receiver 18 or to the autoclave chamber 22.

(3) The instrument display and control panel 24 controls the valve 50 to direct a specific amount of the sterilant from the sterile air or oxygen receiver 18 into an injector 52 where the sterilant is intimately mixed with water vapor in the form of steam from the steam evaporator 20.

(4) The instrument display and control panel 24 controls the operation of regulating valve 56 to control the amount of water vapor in the flow of sterilant into the autoclave chamber 22.

(5) As the sterilant is introduced into the chamber, the internal pressure is slowly increased to increase the volume inside the chamber during the sterilization process which is completed in about 10 minutes. The internal volume is then uniformly, but rapidly decreased toward the end of the cycle to a minimum volume at substantially constant pressure at the completion of the sterilization process. The pressure is nearly constant and the temperature, and composition of ozone in oxygen are carefully controlled during the sterilization process.

At this point sterile air produced by Step 2 above may be directed into the autoclave chamber 22 in two cycles. Once to purge the chamber 22, and a second time to permit removal of the sterilized load.

As an example of the temperatures and pressures contemplated during the sterilization process, the chamber 22 will normally be drawn to minimum volume or alternatively to a vacuum by means of the vacuum source 64 before the introduction of sterilant thereinto. The normal temperatures prior to the introduction of sterilant will be about 80° F. When sterilant is introduced, the pressure inside the chamber will be approximately 10 to 0.5 inch of Mercury or nearly atmospheric in the alternative case and the temperature during the sterilization process will be approximately 90° F. The amount of ozone in oxygen for best sterilization results in the shortest time will be about 40 mg./l.

(6) The sterilant will be discharged from the chamber 22 either by purging the chamber 22 with sterile air and discharging it through the line 122, or by drawing the chamber 22 to a vacuum source and simply discharging the sterilant in the injector 73 in the line 35 carrying ozonator cooling water where it may be dissolved in water and discharged into a waste drain.

The invention contemplates that liquid oxygen may be used in place of the dry oxygen or air 12, with the liquid oxygen being allowed to gasify and to expand before entering the ozonator 14. The heat required to gasify is provided from the sterilant air or oxygen receiver 18, thus serving to hold the sterilant at a reduced temperature throughout the cycle. This heat exchange will also absorb the heat of vaporization caused by the injection of water vapor in the form of steam into the sterilant in the injector 52. The invention also contemplates that the purging of the chamber 22 may be with sterile dry ozonated oxygen or air which further may be used to effect a drying cycle.

It is essential to achieve a low toxicity effluent after the sterilization process to prevent any injuries to personnel using the sterilization equipment. The most obvious way to achieve this effect is through decomposition in water which proceeds rapidly to completion in less than an hour, or for ozone in air, by catalytic decomposition which may be accomplished as stated above by dissolving the sterilant mixture in water in the injector 73, or may be accomplished by decomposition at elevated temperatures, such as bypassing the sterilant through a flame, or by using a surface catalyst such as manganese dioxide which accelerates the reversion of $O_3$ to $O_2$. A combination of these may be desirable which would include heating the sterilant mixture upon discharge to accelerate decomposition, retaining for a sufficient period of time to achieve sufficient decomposition, and then introducing it into the throat of an injector through which water is passing. This ozonated water may then be wasted to sewage. The high momentum exchange between the water and the sterilant in the injector will ensure intimate mixing and solubility so that the decomposition of the ozone will be facilitated by an extended residence of gas phase sterilant dissolved in water. In this instance there will be no chance of reentry of the ozone into inhabited spaces because of the accelerated decomposition and also owing to the presence of traps and vents in typical waste sewage systems.

LIQUID SYSTEM

The invention also contemplates that instead of a gaseous sterilization system, that a liquid sterilization technique may be utilized. A brief description of this system will be given hereinafter. Particularly, with reference to FIG. 2, the numeral 130 indicates generally the liquid sterilization system which includes a liquid source 132 adapted to feed through a pipe line 134 into an injector 136 serving as an oxygen-ozone exchanger. In order to increase the relative solubility of ozone in the liquid in comparison with the solubility of oxygen in the liquid, cooling means 138 are provided around the line 134 before the liquid reaches the injector 136. Thus, the cooling means 138 may cool and/or evaporate oxygen from the heat contained in the liquid to be sterilized. Generally, a desirable temperature of the liquid entering the injector 136 should be approximately 50° F. to 75° F.

It has been the practice to ozonate liquid by introducing the sterilant combination of gases in a permeable membrane or conduit at the bottom of a fluid exposed at the upper surface to ambient atmospheric pressure thus permitting the ozone-oxygen bubbles to rise through a fluid under gravitational effects and density differentials. As the bubble rises, its diameter increases and the ozone concentration at the oxygen-ozone-liquid interface drops. The rise rate in the solution increases rapidly owing to increased buoyancy. This reduces the residence time for ozone in contact with the fluid and concurrently reduces the average $O_3$ concentration at the interface where solubility and sterilization must occur. Accordingly, it does not yield effective sterilization with conservative sizes of equipment and with conservative amounts of ozone. Effectiveness is usually in direct proportion to the height of the fluid beds which are required.

To avoid these disadvantages, it is convenient to replace the gravitational pressure gradient with a hydraulic pressure gradient which can be achieved in a flowing pipe and which is substantially independent of gravitational effects. To this end, the injector 136 serving as an oxygen-ozone exchanger may utilize in combination a plurality of successive injector mixing chambers 140 along the line 134, with ozone introduced into one or more mixing chambers by means of a line 142 from an ozonator 144. The ozonator 144 is supplied with dry oxygen 137 in liquid or gaseous form passed through the cooling means 138 via line 139. Intimate mixing of $O_3$ in the liquid is accomplished in the successive injector mixing chambers 140. Nozzles or flat-plate orifices 146 could also be used for the mixing. The liquid now containing ozone then passes to a closed sterile liquid reservoir 145. According to the pressure gradient imposed, ozone-oxygen will come out of solution in the closed sterile liquid reservoir 145. This gas may be returned, regeneratively by line 147, to the inlet of one or several of the injector mixing chambers 140 in addition to using direct feed via line 142 from the ozonator 144. Alternatively it may be dried and used as an ozonator feed. The usual procedure is to use the regenerative process in conjunction with the direct feed thereby producing a sterile liquid or a liquid sterilant.

The liquid sterilant resulting from the mixture of ozone, oxygen, and liquid in the injectors 136 and 140 and stored in the reservoir 145 is then passed through a line 148, directly into a sterilizing chamber 150. The concentration of ozone in the sterilant will be approximately 2.5 p.p.m. or less if water is used. The invention contemplates that the liquid sterilant will be bathed or sprayed over the articles to be sterilized with the chamber eventually filling up to entirely immerse the articles to be sterilized in a bath of sterilant.

In some cases it may be desirable to have further means to cool the liquid. One means to achieve this end is a water source 154 passed through the coling means 138 and hence to surround the ozonator 144 and the sterilizing chamber 150. Other means to effect the desired cooling might include a liquid oxygen evaporator, an ozonator cooling water heat exchanger, an effluent $O_3$ waste exchanger, an evaporative cooler or any combination thereof.

In order to increase the tolerable energy levels of the ultrasonic excitation, it is anticipated that the sterilizing chamber 150 will be pressurized to an approximate pressure of 20 p.s.i.g. in order to suppress cavitation limitations on the tolerable energy impressed by the ultrasonic excitation. In order to assure a complete and positive sterilization with the liquid method, diffusion gradients should be suppressed in the sterilant in the chamber 150 by providing ultrasonic excitation from an ultrasonic vibration source 152 feeding an ultrasonic transducer 153.

Again, a vacuum reservoir 167 may be connected to the sterilizing chamber 150 by lines 156 and 157 in order to draw the sterilant from the chamber 150 after completion of the sterilization process and discharge to an injector 158 which exhausts to a waste drain to control toxic waste. The injector 158 may be actuated by cooling water through a line 160. Gaseous exhaust from the chamber 150 is accomplished through exhaust line 161.

Electric power of 110 v. AC is supplied to ultrasonic vibration power 152 at 162 and to the ozonator 144 at 164. Also, in order to further increase the solubility of $O_3$ in the liquid 132, an ultrasonic transducer 166 fed from the power 152 may be used in conjunction with the injector mixing chamber 136.

The invention also contemplates that this liquid washer-sterilizer cycle may be followed by a drying with sterile air or ozonated oxygen. Also, the discharge sterilant or the sterile liquid may be desorbed of oxygen, stripped of ozone, and the oxygen being dried for ozonation to conserve oxygen and also to suppress a toxic effluent. Further, along the same line, to increase the concentration of ozone in the sterilant, the sterilant from the reservoir 145 may be directed back to the initial liquid 132, as indicated by dotted line 170, in a complete recirculation.

STERILIZATION SYSTEM

The sterilization system indicated in FIG. 4 of the drawings is a gas-liquid mixing system operating at a uniform hydraulic pressure gradient. It is comprised of a liquid oxygen supply 200, an ozone source or generator 202, an oscillator power supply 204, and a process flow line indicated generally by numeral 206. The line 206 operates in the turbulent flow regime, at or above a Reynolds number of 3,000. High momentum exchange mixing elements are carried in at least certain of the T-shaped flanges 208. These mixing elements are normally flat plate orifices which induce high intensity momentum exchange in the processed liquid effluent entering the flow line 206 at 210. The mixing elements in T-shaped flanges 208 are followed by ozone-oxygen feed tubes 213 and sting-type tunable cantilevers 211 excited at their natural frequency. These further enhance the momentum exchange in addition to that induced by the basic mixing element, the flat plate orifice. In addition, the stings 211 provide mechanical disruptive forces on flocs, plaques, or agglomerates which may be present in the processed liquid effluent. At high impressed excitation energy, the stings may degas the processed liquid. This permits oxygen recovery and reduced toxicity of effluent. Preferably, the stings 211 are positioned upstream of the $O_2$-$O_3$ injectors 213 so that particulate suppression is enhanced.

The orifices in the T's 208 are provided at the flange joints as a matter of convenience. The orifice diameter ratio to the pipe diameter is typically equal to or greater than 0.5.

In the T's 208 securing the orifices, two other elements are mounted although generally not together in the same T. One is an $O_3$-$O_2$ injector 213. The injector 213 is introduced in a thermocouple fitting and extends through the orifice to or past the vena contracta formed by the flow through the orifice. The vena contracta will occur at between zero to five hydraulic diameters downstream of the orifice or point of restricted flow. Hence, the constant hydraulic gradient must be maintained at least until the point of $O_3$-$O_2$ injection. Also, each subsequent point of reduced pressure should be a distance of at least five hydraulic radii downstream from the preceding point. This is most clearly illustrated in FIG. 5 of the drawings. The sting 211 is the second element introduced with similar provision for axial position and sealing as the injector 213 and is shown in FIG. 6 of the drawings. The sting 211 is a thin elongated blade normally made from a ferritic stainless steel and actuated to oscillation by electromagnetics 211a and 211b positioned on opposite sides thereof as shown in FIG. 7. However, as mentioned above, the sting 211 is not normally positioned at the flat plate orifices where $O_3$-$O_2$ is injected.

The $O_3$-$O_2$ injection occurs at approximately 5% concentration by weight. It is introduced in amounts greater than 0.5 miligram per liter of liquid. The injected concentration will attenuate in the flow line. Two factors cause the attentuation. One is the decomposition rate for $O_3$ in water leading to $O_2$. The second attenuating factor is the oxidation load of the material contained in the processed liquid. In the typical waste, this is comprised of organic materials incompletely oxidized in solution or present as particulates. These materials in part comprise the load of waste which causes a reduction in the amount of dissolved oxygen injected to the residual at any point.

Hence, it should be seen that process control can be accomplished by DO (dissolved oxygen) measurement to regulate DO at saturation levels. Similarly, DO at discharge may be regulated such that mixing in the receiving media will insure that proper DO of the mixture is achieved and the $O_3$ evolved to air in occupied space does not exceed 0.05 to 0.1 p.p.m.

Recognizing the rapid $O_3$ and the slower $O_2$ attenuation which will occur, it is necessary to utilize sequential injection. This aspect is shown in FIG. 4. Subsequent injection of $O_3$-$O_2$ is desirably preceded by desorption to reduce the residual gas dissolved in the fluid. FIG. 4 also indicates a series of test points in the flow line between injection points for the $O_3$ which include DO sensors 214 that act to control a power supply 203 to the generator 202. These sensors 214 are useful to assess quantitatively the $O_3$ concentration, the $O_2$ concentration and the corresponding reduction in DO which is an index of fluid load. For a given Reynolds number, these data provide information on time and position which is essential for design of the flow system and for determining the optimum $O_3$-$O_2$ injection flow rate and quantity. It is important to the invention that the injection rate and interval be such that the attenuated $O_3$ concentration exceeds 0.5 milligram per liter at all points in the system except prior to discharge where the ultimate effluent should be nontoxic and not deleterious.

From the above, the purpose for sequential injection is clear. The number of points, or the distance or time in the flow line will depend upon the impressed oxidation load and particulate size present in this load. It is anticipated that in normally operating systems, the time for processing will not exceed 8 minutes. It should be understod that the piping system indicated in FIG. 4 may be rotated to any position. Changes in elevation do not affect the functional result wherein the entrance at 209 and discharge at 216 are at different heights so that in essence a substantially constant hydraulic gradient is present when considering the system as a whole.

The invention also contemplates that excess oxygen can be picked off the piping system at point 218 by a suitable pump 220 and sent into a drier 222 for transfer therefrom through a control valve 224 into the supply line from the liquid oxygen source 200 to the ozone generator 202. A suitable power supply 226 activates the drier 222. Also, excess or desorbed $O_2$ can be picked off earlier at point 219, and fed to the drier 222. The sting 211 can cause such $O_2$ desorbtion.

An absorber indicated by block 230 might be included to receive the output from generator 202 before the ozone concentrated fluid into a supply line 232 so as to remove all excess oxygen with the excess oxygen fed back over line 234 and through valve 236 to the supply to generator 202. The absorber 230 is optional as the $O_3$-$O_2$ concentration can pass directly through line 238.

In some instances, it might also be desirable to have processed liquid effluent entering at point 209 into the piping system 206 pass through some type of absorber to degas or desorb $O_2$ out of the effluent since you can't get new $O_3$ and $O_2$ into the fluid if it is already saturated with $O_2$. A dotted line 240 illustrates this optional arrangement.

It should be understood that the system described hereinabove calls for the preferred implementation utilizing a liquid oxygen feed with recycled, dried, and recovered oxygen. However, continuous recirculation of oxygen may not be feasible, and in this case it is apparent that there exists a desirable bleed-feed rate for the oxygen supply. The rate should satisfy the DO requirements on effluent and the contaminating argon gas. Also, the installed capacity of the bleed-feed $O_2$ supply should be at the average of the anticipated $O_3$-$O_2$ demand. This will minimize the capital investment required.

It should also be noted that in the entire process set forth involving this improved sterilization system, nowhere is the liquid brought into contact with air, thus the process omits the presence of nitrogen. In using only oxygen as described, a number of significant improvements naturally follow. It is a known physical fact that the potential solubility of oxygen in water is five or six times as great if introduced in equilibrium from oxygen as is possible where oxygenation is practiced in equilibrium from air. Similarly, the solubility of ozone in water introduced in equilibrium from oxygen enables a higher concentration of ozone to be injected while less oxygen carrier is required. The elimination of nitrogen makes this possible. Further, the availability of oxygen for recycling and for process enhancement reduces the oxygen expense by an order of magnitude or more while the process enhancement is increased as pointed out above.

It should be understood that a hydraulic pressure gradient will be as much as two orders of magnitude smaller than the gravitational gradient. Thus, the type of pressure gradient contemplated by the invention is one that might be from one half the gravitational gradient to any fraction which is smaller than one half. A gravitational gradient is defined as ± one foot of fluid per foot of path length. Normally, the invention contemplates passing the liquid through the substantially constant hydraulic gradient for a distance until it becomes sterile and a sterilizing fluid.

In the prior art, it is known that times to disinfect or sterilize in gas phase systems are 13 seconds to perhaps 5 minutes. In contrast with this, it is recognized that in liquid systems the time to sterilize may be as short as one minute or as long as one hour. This depends somewhat upon the amount of ozone or oxygen required based upon the oxygen demand of the fluid being processed. In the applicant's case, this time is one in which the pressure is maintained at high levels owing to the hydraulic pressure gradient, and the bubble incidence is suppressed by feeding saturable levels of gas while intense mixing occurs from the turbulence which is required by the operating conditions. This is in contrast with the techniques of ozone-air to water contact processes under a gravitational pressure gradient. There, as much as 2⅓ times the saturation level of gas may be fed. Bubble formation and waste are inevitable. As the bubble of ozone-air rises, its diameter increases and the ozone concentration therein drops. The bubble rises at an accelerating rate with commensurately rapid increase in size, volume, and attendant reduction in ozone concentration. This reduces the residence time in contact with the fluid, and also reduces the average ozone concentration. Accordingly, it does not yield effective sterilization with conservative sizes of equipment. The instant invention specifically avoids these disadvantages.

The instant invention specifically calls for turbulent flow of the liquid. This is almost universally accepted to indicate that the Reynolds number for the flow is greater than 2,000 and the invention contemplates that the Reynolds number, is in fact, 3,000 or more. This level precludes reversion to laminar flow. Reynolds number is defined by the product of the characteristic diameter or dimension of the conduit multiplied by the average velocity of flow and divided by the kinematic viscosity of the fluid. This number is not restricted to circular conduits since the characteristic length of the cross section can be expressed in terms of wetted perimeter, hydraulic radius, and the like without impairment of the significance of the critical Reynolds number being 3,000 or more.

For any fluid, the kinematic viscosity is known or measureable, since it is the ratio of the absolute viscosity to the density. Therefore, the Reynolds number quantitatively relates the critical minimum velocity and the characteristic diameter of the channel as a product, to the quantitative magnitude of the kinematic viscosity. This yields values relating velocity for any diameter. Such values of velocity are quantitatively definitive of time. For example, velocity is the ratio of distance traversed in the conduit divided by the time required. This invention specifically calls for the distance at the constant hydraulic pressure gradient to be sustained until sterilization, disinfection, or purification is effected, or until BOD levels are reduced to the minimum requirements to meet the microbiological definition of these terms.

Hence, it should be understood that the minimum velocity to create a Reynolds number of 3,000 or greater can be established for any diameter pipe size. Assuming a one inch diameter, for example, the velocity must be equal to .36 feet per second. If it is determined for a one inch pipe diameter that it will take 10 minutes to achieve the degree of sterilization required, the conduit length will be 216 feet. If room were available, this might be used as a straight conduit. However, it is also convenient to consider a folder bundle similar to that shown in FIG. 4. Space is conserved by using an equilateral triangular configuration. A short bundle is feasible, and using 19 elements, a bundle height of 11.4 feet would be necessary for the one inch inner-diameter pipe. Practically, 12 foot lengths would be used. In this configuration, as many as five flat plate orifices might be used with a sweep elbow associated with each element. Thus, a computation of the pressure drop in the pipe, orifices, and elbows would equal 1.5 times $10^{-3}$ feet of fluid per foot of line. The size of this bundle would be about 12 feet high by about 2 feet in diameter. In comparison, the gravitational pressure gradient is one foot of fluid per foot of flow traveled.

Thus, the hydraulic gradient in this case is about one fifteen hundredth as great as the gravitational pressure gradient. If the inlet and outlet to the bundle were at the same elevation as is shown for example in the configuration of FIG. 4, no effect of height appears. Even if there is a height differential, it would be immaterial to the process because the hydraulic pressure gradient is maintained across the overall length of the pipes.

The purpose of the flat plate orifices, nozzles, or venturies is to provide intense momentum exchange at those points where $O_2$-$O_3$ is injected, as particularly shown in FIGS. 2 and 5 of the drawings so as to achieve a high mixing effectiveness between the $O_2$-$O_3$ and the fluid at that point across the full area of the fluid contained in the pipe so that substantially instantaneous and thorough mixing of the $O_2$-$O_3$ with the fluid is achieved.

It should be understood that the use of the terms disinfection, purification, and sterilization throughout the specification relate to the use of these terms in their microbiological sense, and that the processes described herein effect bacterial reduction and can be utilized to accomplish any of these three levels of liquid refinement. Hence, for example, the system might be incorporated as a small disinfecting, deodorizing, decolorizing, carbonating device for a swimming pool, an oxidizing, deodorizing disinfectant for a sewage system, a potable water treatment process and a sterilizer-washer for hospital utensils, materials and medical instruments. However, the principles of the process will be the same in each of these four levels of application, with the principal exceptions being perhaps in the concentrations of oxygen-ozone applied, the time length of contact necessary in the uniform hydraulic gradient and in the attendant system geometrically defined by the parameters recited and the objectives sought.

The table which follows on page 25 illustrates what practical ozone concentrations, flow rates, Reynolds numbers and pipe lengths might be necessary to achieve various degrees of bacterial reduction on various fluids by using the process of the invention.

It should also be understood that in some instances it might be desirable to utilize liquid $CO_2$ as a feed into an ozone generator in addition to the liquid oxygen if $CO_2$ would not be deleterious to the fluid or receiving environment since $CO_2$ possesses excellent qualities for carrying $O_3$ and aiding its solubility into the fluid. For example, use of $CO_2$ as the liquid gas carrier in a swimming pool purification system would work quite satisfactorily.

| Liquid | Function | Wt. concentration of $O_3$ in $O_2$, percent | Injected concentration $O_3$-$O_2$ in liquid p.p.m. | Demand of liquid p.p.m. of $O_3$, $O_3$-$O_2$ | Time | Flow rate, g.p.m. | I.D. pipe, in. | V, f.p.s., $N_R$=3,000 | Determined length, ft. | Practical length, ft. | Revised V, f.p.s.[1] | Operating $N_R$[2] |
|---|---|---|---|---|---|---|---|---|---|---|---|---|
| Water | Purification[3] | [4] 2-10 | 0.5 or more | 50 or less | 1 min. or more | 4,500 | 18 | .03 | 2 | 20 | 0.3 | 30,000 |
| Do | Disinfection | 2-10 | 1.25 of more | do | 2 min. or more | 900 | 8 | .06 | 8 | 16 | 0.12 | 6,000 |
| Filtered water | Sterilization | 2-10 | 1.50 or more | do | 5 min. or more | 15 | 1 | 0.5 | 150 | 200 | .67 | 4,000 |
| Filtered sewage | Purification | 2-10 | 50 | 150 to 450 | 10 min. or more | 24,000 | [5] 24 | 0.5 | 6 | 60 | 0.1 | 4,000 |
| Do | Disinfection | 2-10 | 50 | 150 to 450 | 15 min. or more | 24,000 | [5] 24 | .01 | 10 | 60 | .06 | 18,000 |
| ...do | ...do | 2-10 | 50 | 200 or less | 10 min. or more | 6,400 | [6] 14 | .01 | 22 | 36 | .057 | 4,900 |
| Secondary treatment sewage effluent | Purification | 2-10 | 100 mg. per L or less[7] | 10 or less | 1 min. or less | [8] 2,000 | 12 | .035 | 36 | 40 | .066 | 3,300 |
| Air | Disinfection | 2-10 | do | do | 2 min. or more | 2,000 | 12 | 0.6 | 72 | 72 | .6 | 3,000 |
| | Sterilization | 2-10 | do | do | 5 min. or less | 2,000 | 12 | 0.6 | 180 | 180 | .6 | 3,000 |

[1] To obtain same time in process.
[2] Corresponding to increased velocity.
[3] May be used in liquid-gas washer for pollution suppression.
[4] 6% is a useful practical range.
[5] Flow in 4 channels, 6,000 g.p.m. each.
[6] Flow split in 2 channels.
[7] Milligrams of ozone per liter of mixture.
[8] Cfm. at .075 density lbs. per foot.[3]

While the invention has been illustrated and described as being primarily applicable to the process for generating a sterilant or a sterile liquid, it must be recognized by those skilled in the art that the method according to the present invention also lends itself to the sterilization of other materials, particularly solids, but also including permeable materials such as fabrics, paper and wrap materials where a gaseous sterilant is produced rather than a liquid sterilant, and where the gas would penetrate through the permeable material.

While in accordance with the patent statutes only the best known embodiments of the invention have been illustrated and described in detail, it is to be particularly understood that various modifications can be made to still fall within the objects of the invention.

What is claimed is:

1. A process to effect sterilization, disinfection or purification by bacterial count reduction in a liquid which includes the steps of flowing the liquid through a confined path in a hydraulic pressure gradient at substantially constant pressure sustained throughout the confined path, intimately mixing a mixture of gaseous ozone in an oxygen containing carrier gas with said liquid by a substantially instantaneous injection of said ozone and carrier gas mixture into the liquid under a high momentum exchange mixing condition in the path so as to provide a uniform concentration of ozone and carrier gas mixture throughout the liquid at the point of ozone and carrier gas injection, and maintaining a sufficient concentration of ozone in the liquid throughout at least a portion of the path until a desired level of result is achieved.

2. A method to effect purification, disinfection or sterilization of a liquid by becterial reduction which comprises the steps of flowing the liquid through a confined path in a hydraulic pressure gradient at a substantially constant pressure above atmospheric and at a sufficient flow rate to produce turbulence in the liquid as it flows, providing at least one point of momentarily reduced pressure along the confined path to create a greatly increased turbulent condition of the liquid at such point, injecting gaseous ozone mixed in a gaseous oxygen containing carrier into the liquid at or adjacent to said one point of the path to achieve a high momentum exchange and uniform distribution of the ozone and gaseous carrier mixture throughout the liquid, and maintaining the flow path of the liquid for a distance equal to at least five times the hydraulic radius of the path downstream of said one point, and providing at least one more point of momentarily reduced pressure downstream of said one point and at least a distance of five hydraulic radii downstream from said one point to achieve further mixing of the ozone and gaseous carrier into the liquid.

3. A process to effect sterilization, disinfection or purification by bacterial count reduction in a liquid which includes the steps of flowing the liquid through a confined path in a hydraulic pressure gradient at substantially constant pressure sustained throughout the confined path, intimately mixing a gaseous mixture of ozone in oxygen with said liquid by a substantially instantaneous injection of said ozone and oxygen mixture into the liquid under a high momentum exchange mixing condition in the path so as to provide a uniform concentration of said ozone and oxygen mixture throughout the liquid at the point of ozone and oxygen injection, and maintaining a sufficient concentration of ozone in the liquid throughout at least a portion of the path until a desired level of bacterial count has been reached in such portion.

4. A process according to claim 3 which includes maintaining the concentration of ozone in oxygen at between about 2% to about 10%, and includes providing not more than that amount of ozone in oxygen in gaseous form than can be mixed in the fluid to effect saturation.

5. A process according to claim 3 which includes providing at least one more point of momentarily reduced pressure downstream of said one point to create a greatly increased turbulent condition of the liquid at such one more point.

6. A process according to claim 3 which includes providing sufficient points of mixing the gaseous mixture of ozone in oxygen with such fluid so as to maintain a substantially uniform concentration of said mixture in the fluid throughout the subsequent length of the confined path.

7. A process according to claim 6 which includes reducing the size of any particulate matter in the fluid before injection of the ozone in oxygen into the fluid.

8. A process according to claim 3 which includes recirculating the fluid through the path as many times as necessary to maintain the concentration levels desired, and to achieve the desired reduction in bacterial count.

9. A process according to claim 8 which includes removing retained oxygen from the fluid before recirculation.

10. A process according to claim 3 where the ozone in oxygen concentration in the fluid is sustained at said sufficient concentration level along the entire path by providing sequential injection of ozone on oxygen at succeeding points of intense momentum exchange.

11. A process according to claim 10 which as a final step after the desired reduction in bacterial count is reached includes reducing the ozone to non-toxic concentrations before discharge.

12. A process according to claim 10 where the effluent is discharged into receiving media in non-toxic concentrations, mixed, and detained to permit ozone decomposition to safe levels and dissolved oxygen concentration commensurate with the amounts fed.

References Cited

UNITED STATES PATENTS

| | | | |
|---|---|---|---|
| 3,326,747 | 6/1967 | Ryan et al. | 210—64X |
| 3,448,045 | 6/1969 | Hess et al. | 210—63 |
| 1,176,287 | 3/1916 | Hall et al. | 21—97 |
| 2,050,771 | 8/1936 | Wait | 21—57X |
| 2,388,753 | 11/1945 | Mallmann et al. | 21—58 |
| 2,417,722 | 3/1947 | Wolff | 210—19 |

FOREIGN PATENTS

| | | | |
|---|---|---|---|
| 760,733 | 11/1956 | Great Britain | 204—314 |
| 767,227 | 1/1957 | Great Britain | 210—63 |

MORRIS O. WOLK, Primary Examiner

B. S. RICHMAN, Assistant Examiner

U.S. Cl. X.R.

21—54, 57, 58, 91, 98, 106, 108; 204—322; 210—61, 63, 64, 19